July 10, 1956

R. B. ANDERSON 2,753,908

LIVESTOCK FEED GRINDER

Filed Nov. 9, 1953

Robert B. Anderson
INVENTOR.

BY *Clarence A. O'Brien*
*and Harvey B. Jacobson*
Attorneys

July 10, 1956
R. B. ANDERSON
2,753,908
LIVESTOCK FEED GRINDER
Filed Nov. 9, 1953
2 Sheets—Sheet 2
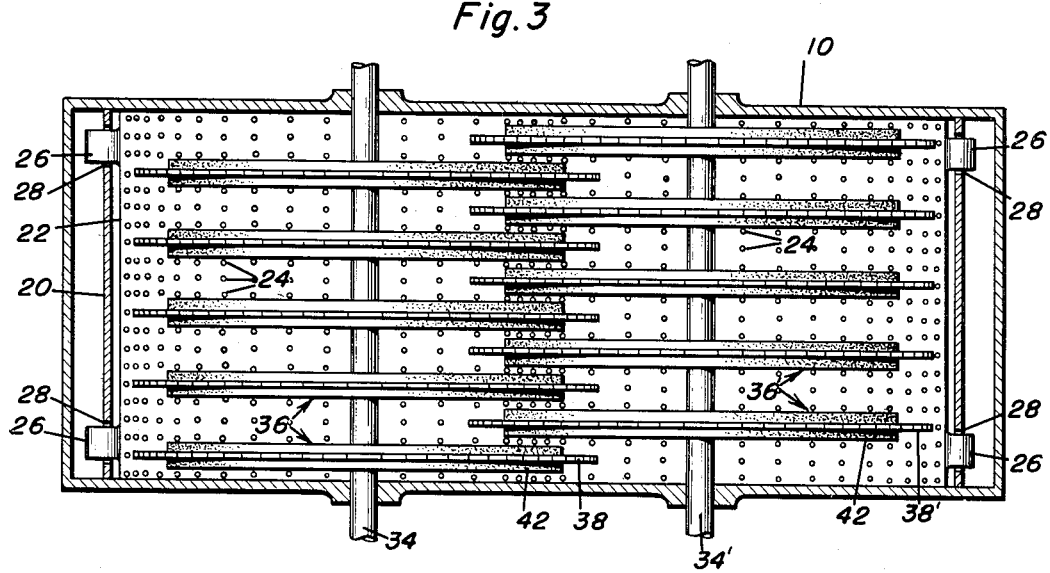
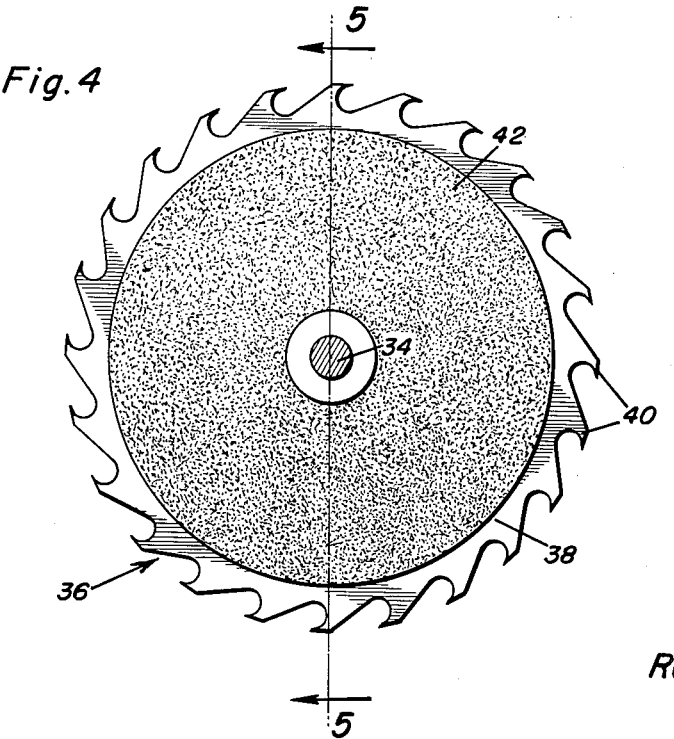
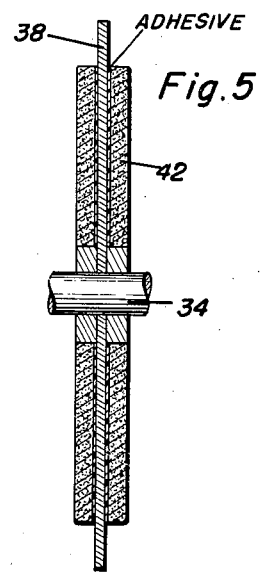
Robert B. Anderson
INVENTOR.

United States Patent Office 2,753,908
Patented July 10, 1956

2,753,908
LIVESTOCK FEED GRINDER
Robert B. Anderson, Madison, Wis.

Application November 9, 1953, Serial No. 390,835

3 Claims. (Cl. 146—79)

This invention relates to a livestock feed grinder and more particularly to a feed grinder for grinding mixtures of grain and vegetable materials for feeding animals.

An object of this invention is to provide a feed grinder having an inner and an outer housing with grinding means mounted within the inner housing.

Another object of this invention is to provide a feed grinder having a plurality of cutting disks provided with saw teeth on the outer periphery thereof, with the cutting disks mounted on a pair of shafts so that the cuttings disks on one shaft engage between the cutting disks on the other shaft.

A further object of this invention is to provide a feed grinder having cutting disks therein, wherein said cutting disks have abrasive material secured to the sides thereof for further reducing the size of the material passing through the grinder.

A further object of the present invention is to provide a grinding machine in which material is ground with less power than with machines heretofore known.

A still further object of this invention is to provide a machine wherein grain can be ground to a finer degree without greatly increasing the power.

These together with other objects and advantages which will become subsequently apparent reside in the details of construction and operation as more fully hereinafter described and claimed, reference being had to the acompanying drawings forming a part hereof, wherein like numerals refer to like parts throughout, and in which:

Figure 3 is a horizontal sectional view of the preferred form of the present invention showing the overlapping of the cutting and grinding disks and taken on the line 3—3 of Figure 1;

Figure 4 is a side view of one of the cutting and grinding disks; and,

Figure 5 is a sectional view of a cutting and grinding disk taken substantially along the section line 5—5 of Figure 4.

Figure 1:
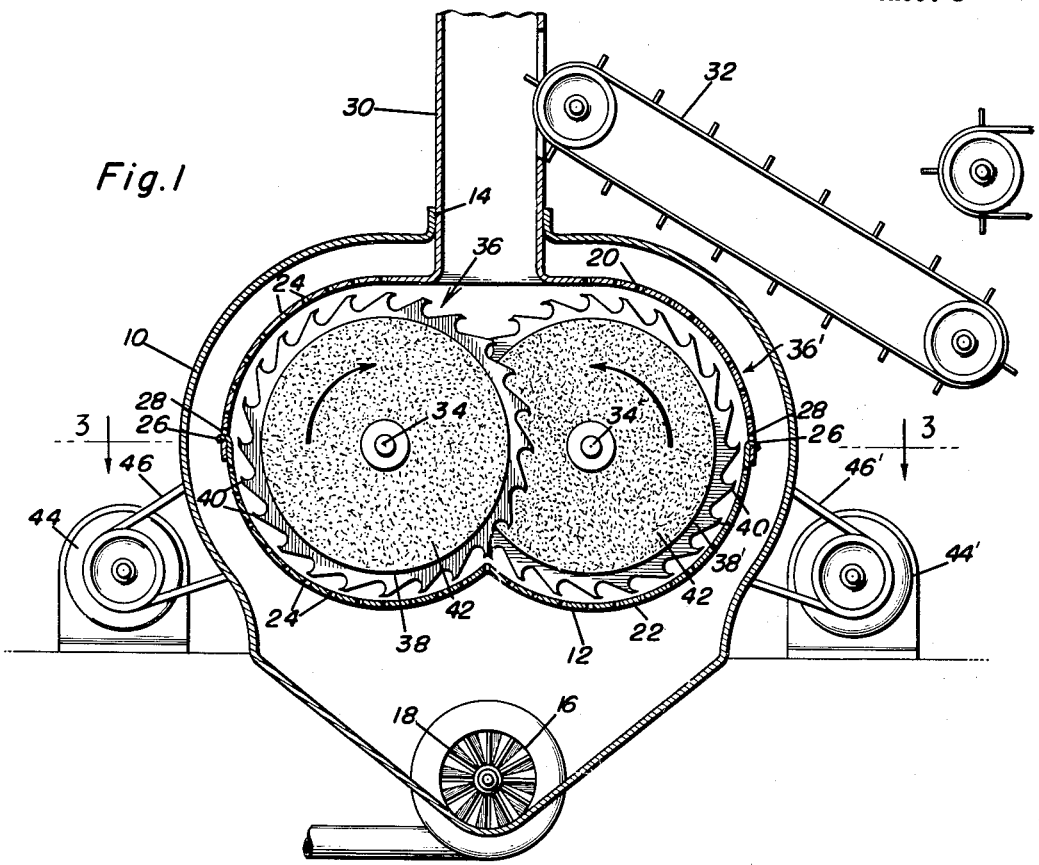
Figure 1 is a vertical sectional view of a preferred form of the present invention showing feeding means and discharge means connected thereto.
Figure 2:
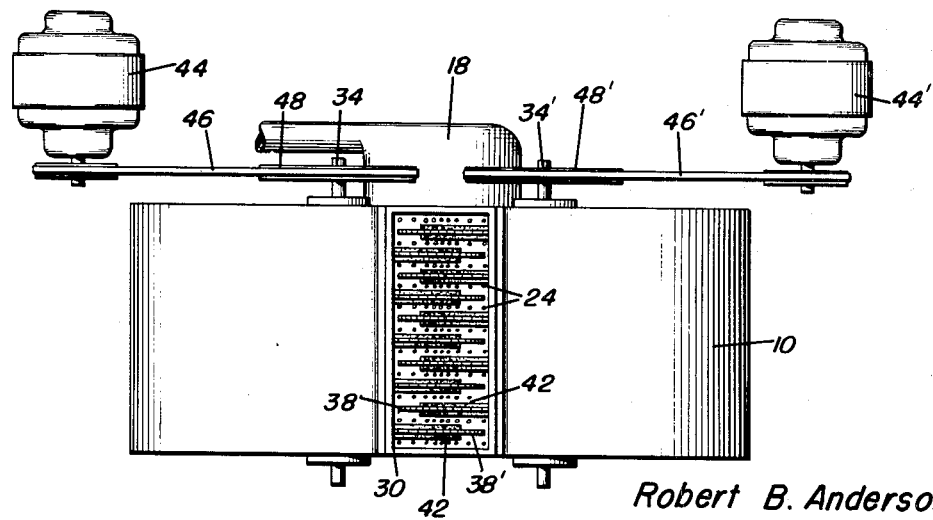
Figure 2 is a top view of the preferred form of the present invention drawn to a reduced scale.

Referring now more specifically to the accompanying drawings it will be seen that the improved form of the livestock feed grinder forming the subject of this invention includes, as shown in Figure 1, an outer housing 10 having an inner casing 12 mounted therein.

The housing 10 has an opening 14 at the top thereof and a discharge opening 16 in one side at the bottom thereof. The bottom walls of the housing 10 slope downwardly toward each other and form a trough communicating at one end with the opening 16 in the side wall. A fan-type blower 18 is connected adjacent the opening 16 to convey the ground material from the housing 10 to a desired position.

The casing 12 is mounted within the housing 10 and spaced from the bottom thereof. The casing 12 is formed of an upper member 20 and a lower member 22 removably secured thereto. The members 20 and 22 when in assembled position form a pair of cylindrical chambers with laterally spaced axes intersecting each other intermediate said axes. Each of the members 20 and 22 is provided with a plurality of apertures 24 therein, which apertures allow ground material to pass from the inside of the inner casing to the inside of the outer housing. The lower member 22 is secured to the upper member 20 by means of hooks 26 at the ends of member 22 engaging in slots 28 in the member 20. The upper member 20 has an inlet conduit 30 secured to the midpoint thereof. The conduit 30 extends through the opening 14 in the outer housing 10 and material to be ground is fed through the conduit 30 into the casing 12.

A suitable conveyor 32 is used to feed the material into the inlet conduit 30. The inlet conduit 30 also serves as an air vent for the housing 10 and the casing 12.

A pair of shafts 34, 34' is mounted for rotation within each of the cylindrical chambers formed in the casing 12 in the axes thereof. A plurality of cutting and grinding disks 36, 36' are mounted in spaced relationship on the shafts 34, 34'. The disks 36, 36' on each shaft 34, 34' are staggered with respect to the disks on the other shaft. The shafts 34, 34' are spaced apart a distance less than the diameter of the disks 36 whereby the disks 36, 36' of either shaft 34, 34' overlap those of the other shaft.

Each of the disks 36, 36' is composed of a rotary saw blade 38 having a series of teeth 40 spaced around the periphery thereof. A plate of abrasive material 42 is secured to each side of each of the saw blades 38 by means of a suitable adhesive. The saw blades 38 are mounted on the shafts 34, 34' so that the teeth thereof extend in opposite directions.

A pair of separate electric motors 44, 44' are connected by means of a pair of belts 46, 46' to pulleys 48, 48' on the end of shaft 34 for rotating the shaft 34 and consequently the saw blades 38. Each of the motors 44, 44' is adapted to rotate in the opposite direction to the other, whereby the saw blades will be rotated in opposite directions.

In operation, the items to be ground are fed into the rotating saw and abrasive assemblies. Large items such as ear corn, hay and straw are torn apart by the saw teeth. The cut pieces fall between the abrasive surfaces and are further reduced in size until they pass through the screen as ground material. Smaller grain such as corn, oats and barley fall directly between the abrasive surfaces, with the larger ones being reduced in size and then through the screen. The fan blower 18 conveys the ground material from the outer housing 10 to the desired position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a grinding machine, a fixed casing having a perforated bottom and comprising a pair of substantially cylindrical chambers having laterally spaced axes and communicating intermediate said axes, a pair of rotatably mounted shafts extending through said casing in the axes of said chambers, a plurality of cutting and grinding disks fixed on each shaft and each comprising a circular saw and flat abrasive grinding members secured to opposite sides of said saw and having side grinding faces, the disks on each shaft overlapping those on the other shaft, and separate motors operatively connected to said shafts and driving the same in opposite directions relatively.

2. The combination of claim 1, said grinding members comprising abrasive disks.

3. In a grinding machine, a fixed casing having perforations therein and comprising a pair of substantially cylindrical chambers having laterally spaced axes and communicating intermediate said axes, a pair of rotatably mounted shafts extending through said casing in the axes of said chambers, a plurality of cutting and grinding disks fixed on each shaft and each comprising a circular saw and flat abrasive grinding members secured to opposite sides of said saw and having side grinding faces, the disks on each shaft overlapping those on the other shaft and means operatively connected to said shafts and driving the same in opposite directions relatively.

References Cited in the file of this patent

UNITED STATES PATENTS

| | | |
|---|---|---|
| 85,067 | Burbank | Dec. 22, 1868 |
| 803,526 | Cunning | Oct. 31, 1905 |
| 1,168,809 | Hogberg | Jan. 18, 1916 |
| 2,181,397 | Everett | Nov. 28, 1939 |